United States Patent
Wang

(10) Patent No.: US 9,304,246 B2
(45) Date of Patent: Apr. 5, 2016

(54) COMPOSITE LIGHT GUIDE PLATE, APPARATUS AND METHOD FOR MANUFACTURING SAME

(71) Applicant: HON HAI PRECISION INDUSTRY CO., LTD., New Taipei (TW)

(72) Inventor: Jia-Ming Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 167 days.

(21) Appl. No.: 14/225,365

(22) Filed: Mar. 25, 2014

(65) Prior Publication Data

US 2014/0293653 A1    Oct. 2, 2014

(30) Foreign Application Priority Data

Mar. 26, 2013   (TW) .............................. 102110613 A

(51) Int. Cl.
| | |
|---|---|
| *F21V 8/00* | (2006.01) |
| *B29C 59/04* | (2006.01) |
| *B29C 59/02* | (2006.01) |
| *B29D 11/00* | (2006.01) |
| *B29C 43/22* | (2006.01) |
| *B29C 43/30* | (2006.01) |

(52) U.S. Cl.
CPC ............ *G02B 6/0065* (2013.01); *B29C 43/222* (2013.01); *B29C 43/30* (2013.01); *B29C 59/022* (2013.01); *B29C 59/04* (2013.01); *B29D 11/00663* (2013.01); *G02B 6/0016* (2013.01); *G02B 6/0036* (2013.01); *B29C 2059/023* (2013.01); *B29C 2793/009* (2013.01); *G02B 6/0053* (2013.01)

(58) Field of Classification Search
CPC .. G02B 6/0065; G02B 6/0016; G02B 6/0036; B29C 43/222; B29C 43/30; B29C 59/022; B29C 59/04; B29D 11/00663
See application file for complete search history.

(56) References Cited

U.S. PATENT DOCUMENTS

| | | | | |
|---|---|---|---|---|
| 2011/0090713 A1* | 4/2011 | Chen | ................... | G02B 6/0036 362/612 |
| 2012/0236574 A1* | 9/2012 | Lai | ....................... | G02B 6/0038 362/317 |

* cited by examiner

*Primary Examiner* — Mary Ellen Bowman
(74) *Attorney, Agent, or Firm* — Novak Druce Connolly Bove + Quigg LLP

(57) ABSTRACT

A composite light guide plate comprises a light guide plate and a prism structure adhering to the light guide plate. The light guide plate comprises a light emitting surface. A plurality of first microstructures is formed on the light emitting surface. The prism structure is adhered on the light emitting surface of the light guide plate. The prism structure comprises a first surface in contact with the light emitting surface. A plurality of second microstructures is formed on the first surface. Each second microstructure is corresponding to and in tight contact with one of the first microstructure. An apparatus and a method for manufacturing the composite light guide plate is also provided.

20 Claims, 3 Drawing Sheets

COMPOSITE LIGHT GUIDE PLATE, APPARATUS AND METHOD FOR MANUFACTURING SAME

BACKGROUND

1. Technical Field

The present disclosure relates to a composite light guide plate, an apparatus for manufacturing the composite light guide plate, and a method for manufacturing the composite light guide plate using the apparatus.

2. Description of Related Art

A typical backlight module includes an upper diffuser, a first prism, a second prism, a bottom diffuser, a light guide plate, and a reflector stacking in the described order, which have a great thickness.

A typical method of manufacturing a light guide plate includes forming a flat light guide plate and then printing a plurality of micro-structures on the surface of the flat light guide plate, which is inefficient.

Therefore, it is desirable to provide a composite light guide plate, an apparatus for manufacturing the composite light guide plate, and a method for manufacturing the composite light guide plate using the apparatus that can overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
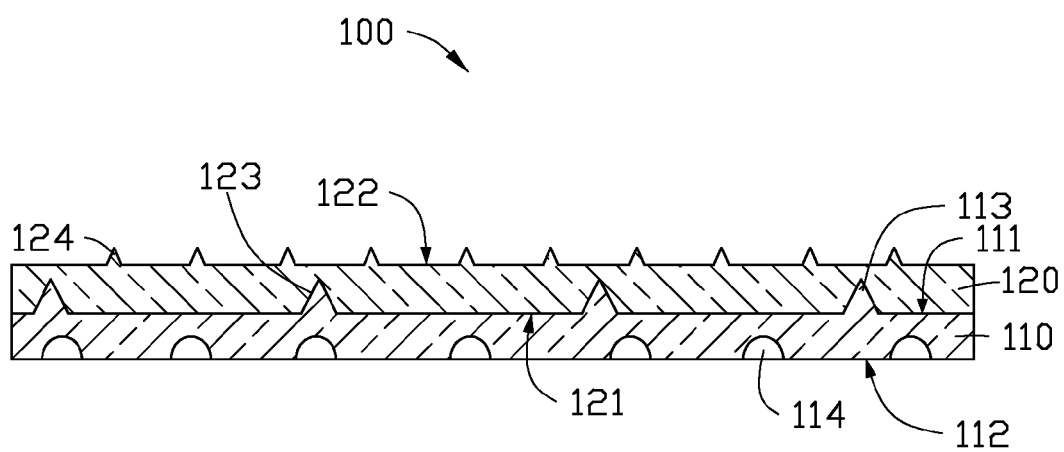
FIG. 1 is a schematic, sectional view of a composite light guide plate according to an exemplary embodiment of the present disclosure.

FIG. 1 shows a composite light guide plate 100 according to a first embodiment. The composite light guide plate 100 includes a light guide plate 110 and a prism structure 120 in tight contact with the light guide plate 110.

The light guide plate 110 includes a light emitting surface 111 and a bottom surface 112 opposite to the light emitting surface 111. A plurality of first microstructures 113 are formed on the light emitting surface 111. A plurality of third microstructures 114 are formed on the bottom surface 112. In this embodiment, the first microstructures 113 are tapered projections, spaced from each other and arranged in a matrix. The third microstructures 114 are hemispheroidal grooves, spaced from each other and arranged in a matrix. The light guide plate 110 can be made of resin with diffusion particles wherein.

The prism structure 120 adheres on the light emitting surface 111 of the light guide plate 110. The prism structure 120 is plate-shaped. The prism structure 120 includes a first surface 121 in contact with the light emitting surface 111, and a second surface 122 opposite to the first surface. A plurality of second microstructures 123 are formed on the first surface 121. Each second microstructure 123 is corresponding to and in tight contact with one of the first microstructure 113. In this embodiment, the second microstructures 123 are tapered grooves, spaced from each other and arranged in a matrix. A plurality of fourth microstructures 124 are formed on the second surface 122. The fourth microstructures 124 are tapered projections, spaced from each other and arranged in a matrix to better disperse rays emitted from the prism structure 120. In this embodiment, the number of the fourth microstructures 124 is greater than that of the first microstructure 113.

The first microstructures 113, the third microstructures 114, the second microstructures 123, and the fourth microstructures 124 are not limited in the shapes disclosed in this embodiment.

The composite light guide plate 100 is composed of the light guide plate 110 and the prism structure 120. When the composite light guide plate 100 is used in a backlight module, there is no need to include a first prism, a second prism, and a bottom diffuser in the backlight module, and, further, the prism structure 120 is in tight contact with the light guide plate 110, therefore, the backlight module can be thinner.

Figure 2:
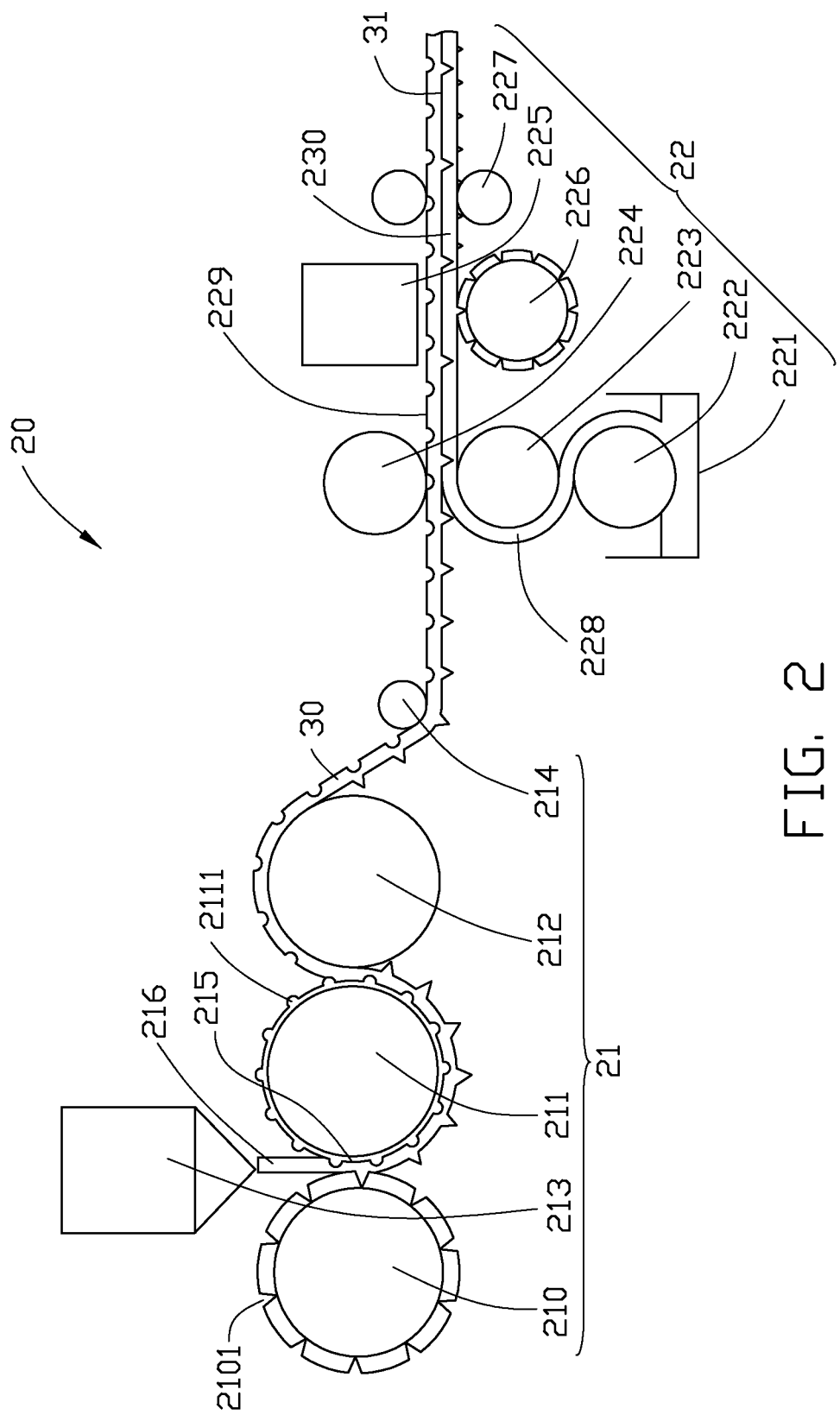
FIG. 2 is schematic view of a portion of an apparatus for manufacturing composite light guide plate according to an exemplary embodiment of the present disclosure.
Figure 3:
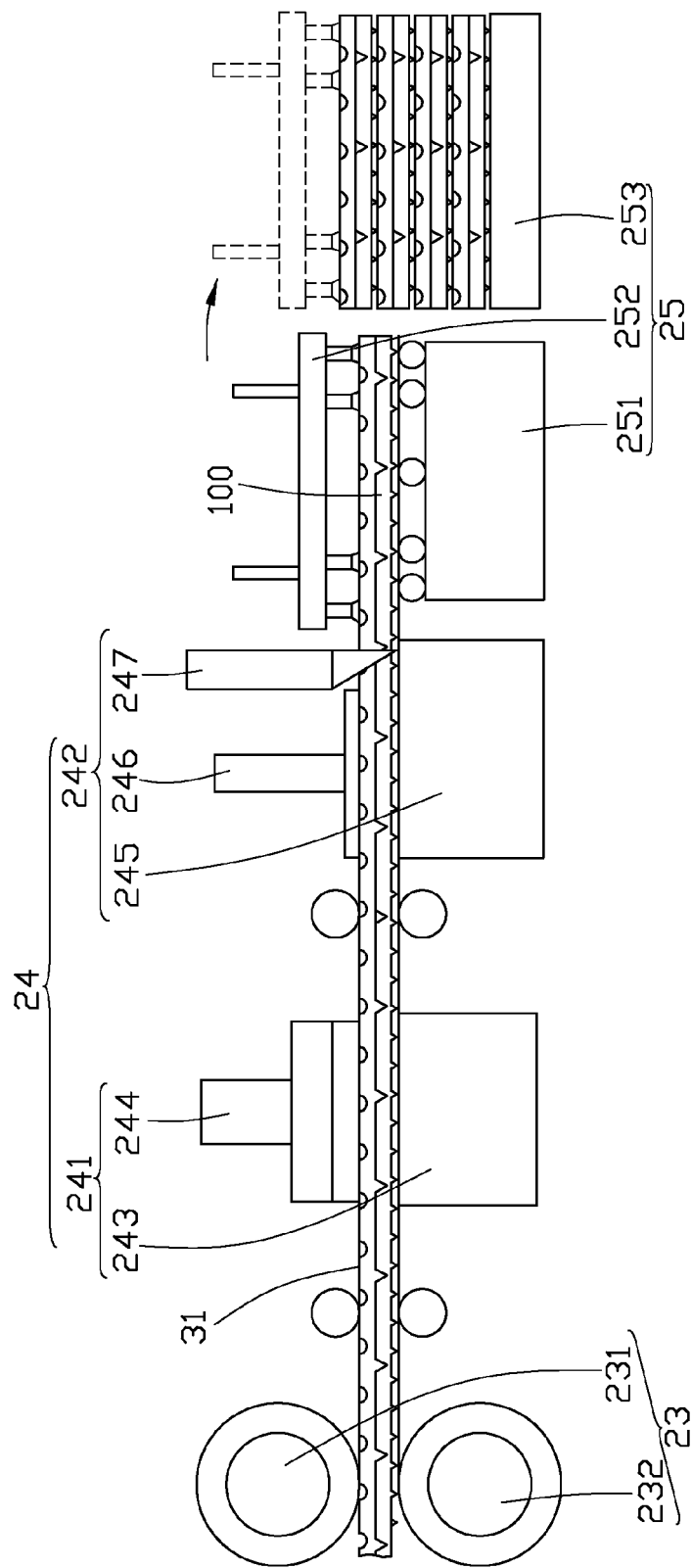
FIG. 3 is schematic view of another portion of the apparatus for manufacturing composite light guide plate according to an exemplary embodiment of the present disclosure.

FIGS. 2-3 show an apparatus 20 for manufacturing the composite light guide plate 100. The apparatus 20 includes a first molding device 21, a second molding device 22, an adhering device 23, a cutting device 24, and a collecting device 25, which are in a production line arrangement in the described order.

The first molding device 21 is configured for molding the light guide plate 110. The first molding device 21 includes a first pattern roller 210, a second pattern roller 211, a polishing roller 212, a feeder 213, and a first pinch roller 214.

The first pattern roller 210, the second pattern roller 211, and the polishing roller 212 are on a same plane and are parallel with each other. The first pattern roller 210, the second pattern roller 211, and the polishing roller 212 are arranged in the described order. The first pattern roller 210 includes a first pattern 2101 on surface. The first pattern 2101 is configured for forming the first microstructures 113 on the light guide plate 110. The second pattern roller 211 includes a second pattern 2111 on surface. The second pattern 2111 is configured for forming the third microstructures 114 on the light guide plate 110. The first pattern roller 210 and the second pattern roller 211 define a guide channel 215 therebetween. A width of the guiding channel 215 determines a thickness of the light guide plate 110.

The feeder 213 is arranged above and is aligned with the guide channel 215. The feeder 213 contains pre-cured resin, which is a raw material of the light guide plate 110. The feeder 213 is configured for molding a pre-cured resin sheet 216 and providing the pre-cured resin sheet 216 to the guide channel 215.

Circulating water heating systems (not shown) are arranged in and heat the first pattern roller 210 and the second pattern roller 211 to a high temperature to intenerate the pre-cured resin sheet 216. A circulating cooling water system (not shown) is arranged in and cools the polishing roller 212 to a low temperature to solidify the pre-cured resin sheet 216 transferred from the first pattern roller 210 and the second pattern roller 211 and provides a light guide plate sheet 30.

The first pinch roller 214 is arranged adjacent to the polishing roller 212 and is away from the second pattern roller 211. The first pinch roller 214 is configured for adjusting a strain on the light guide plate sheet 30 transferred from the polishing roller 212 and preventing the light guide plate sheet 30 from warping.

The second molding device 22 is configured for forming the prism structure 120 on one side of the light guide plate 110 transferred from the first molding device 21. The second molding device 22 includes a glue tank 221, a glue roller 222, a first pressing roller 223, a second pressing roller 224, an ultraviolent (UV) curing machine 225, a third pattern roller 226, and at least two second pinch rollers 227.

The glue tank 221 contains UV curable glue. The glue roller 222 is partly received in the glue tank 221 and is in contact with the UV curable glue. The first pressing roller 223 is arranged above and is aligned with the glue roller 222. The second pressing roller 224 is arranged above and is aligned with the first pressing roller 222. The glue roller 222, the first pressing roller 223, and the second pressing roller 224 are parallel with each other. A UV curable glue layer 228 can be transferred from the glue roller 222 to the first pressing roller 223 and be adhered on the first pressing roller 223 when the glue roller 222 and the first pressing roller 223 rotate. The first pressing roller 223 and the second pressing roller 224 are configured for cooperatively pressing the UV curable glue layer 228 and the light guide plate sheet 229 therebetween and for tightly bonding the UV curable glue layer 228 on the surface of the light guide plate sheet to form a glue coating light guide plate sheet 229. Therefore, a plurality of second microstructures 123 can form on a surface of the UV curable glue layer 228 facing the light guide plate sheet, wherein the second microstructures 123 are in contact with and are corresponding to the first microstructures 113. A thickness of the UV curable glue layer 228 on the first pressing roller 223 is controlled by a space between the first pressing roller 223 and the glue roller 222. The distance between the first pressing roller 223 and the second pressing roller 224 is substantially equal to a predetermined thickness of the composite light guide plate 100 to be manufactured.

The third pattern roller 226 is arranged adjacent to and parallel with the first pressing roller 223. The third pattern roller 226 is below and in contact with the UV curable glue layer 228 of the glue coating light guide plate sheet 229 transferred from the first pressing roller 223. The third pattern roller 226 is configured for forming a plurality of fourth microstructures 124 on a surface of the UV curable glue layer 228 away from the light guide plate sheet 30.

The UV curing machine 225 is arranged above and is aligned with the third pattern roller 226. The UV curing machine 225 is configured for curing the UV curable glue layer 228, and translating the UV curable glue layer 228 to be a prism structure sheet 230. That is to say, the UV curing machine 225 is configured for translating the glue coating light guide plate sheet 229 to a composite light guide plate sheet 31.

The two second pinch rollers 227 are arranged adjacent to and parallel with the third pattern roller 226. The two second pinch rollers 227 are respectively in contact with two opposite surfaces of the composite light guide sheet. The two second pinch rollers 227 are configured for adjusting a strain on the composite light guide plate sheet 31 and preventing the composite light guide plate sheet 31 from warping.

The adhering device 23 is configured for forming covering films on the two opposite surfaces of the composite light guide plate sheet 31 transferred from the third pattern roller 226. The adhering device 23 includes a first adhering roller 231 and a second adhering roller 232. Covering films are rolled on the first adhering roller 231 and the second adhering roller 232. The first adhering roller 231 and the second adhering roller 232 are respectively arranged on the opposite side of the composite light guide plate sheet 31.

The cutting device 24 is configured for cutting the composite light guide plate sheet 31 in predetermined shape. In this embodiment, the cutting device 24 is configured for cutting the composite light guide plate sheet 31 to a plurality of composite light guide plates 100 in predetermined length and width. The cutting device 24 includes a width cutting machine 241 and a length cutting machine 242. The width cutting machine 241 is configured for cutting the width of the composite light guide plate sheet 31 covered by the covering films. The width cutting machine 241 includes two first supporters 243 and two first cutters 244. Each first cutter 244 is corresponding to one of the first supporters 243. The length cutting machine 242 is configured for cutting the length of the composite light guide plate sheet 31 covered by the covering films. The length cutting machine 242 includes a second supporter 245, a pressing board 246, and a second cutter 247. The second supporter 245 is aligned with and is on the bottom of the pressing board 246 and the second cutter 247. The pressing board 246 is configured for fixing the composite light guide plate 100.

The collecting device 25 is configured for collecting the composite light guide plates 100 cut by the cutting device 24. The collecting device 25 includes a transport table 251, a transferring manipulator 252, and a stacking table 253. The transferring manipulator 252 is configured for transferring the composite light guide plates 100 arranged on the transport table 251 to the stacking table 253. The stacking table 253 is configured for arranging the composite light guide plates 100.

In an alternative embodiment, the adhering device 23, the cutting device 24, and the cutting device 25 can be omitted. The apparatus 20 can also include more pinch rollers.

A method for manufacturing composite light guide plates using the above apparatus 20 comprises the following steps.

In step 1, the apparatus 20 is provided.

In step 2, a pre-cured resin sheet 216 is molded and is provided by the feeder 213, and then the pre-cured resin sheet 216 is transferred to the guide channel 215 between the first pattern roller 210 and the second pattern roller 211. A plurality of first microstructures 113 and third microstructures 114 are formed on two opposite sides of the pre-cured resin sheet 216 as the first pattern roller 210 and the second pattern roller 211 rotate. Then the pre-cured resin sheet 216 with the first microstructures 113 and the third microstructures 114 is solidified by the polishing roller 212, forming a light guide plate sheet 30.

In step 3, a UV curable glue layer 228 is transferred from the glue roller 222 to the first pressing roller 223 and is adhered on the first pressing roller 223 as the glue roller 222 and the first pressing roller 223 rotate. Then, the UV curable glue layer 228 and the light guide plate sheet 30 are pressed together by the first pressing roller 223 and the second pressing roller 224 to form a glue coating light guide plate sheet 229. A plurality of second microstructures 123 form on a surface of the UV curable glue layer 228 facing the light guide plate sheet 30, wherein the second microstructures 123 are in contact with and are corresponding to the first microstructures 113. A plurality of fourth microstructures 124 are formed on the surface of the UV curable glue layer 228 away from the light guide plate sheet 30 by the third pattern roller 226, and then the UV curable glue layer 228 with the fourth microstructures 124 is cured by the UV curing machine 225, and the UV curable glue layer 228 is transformed to be a prism structure sheet 230. Therefore, a composite light guide plate sheet 31 is formed.

In step 4, covering films are respectively formed on two opposite surfaces of the composite light guide plate sheet 31 when the adhering device 23 runs.

In step 5, the composite light guide plate sheet 31 is cut to be a plurality of composite light guide plates 100 by the cutting device 24 in predetermined length and width.

In step 6, the composite light guide plates 100 are stacked on the stacking table 253 by the collecting device 25.

The above apparatus 20 and the method for manufacturing a composite light guide plate employ a first molding device 21 for pressing and patterning the pre-cured resin sheet 216 simultaneously, and employ a second molding device 22 for forming a prism structure sheet on a light guide plate sheet directly, which is efficient.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A composite light guide plate, comprising:
    a light guide plate, the light guide plate comprising a light emitting surface, a plurality of first microstructures formed on the light emitting surface; and
    a prism structure adhering on the light emitting surface of the light guide plate, the prism structure comprising a first surface in contact with the light emitting surface, a plurality of second microstructures formed on the first surface, each second microstructure being corresponding to and in tight contact with one of the first microstructures.

2. The composite light guide plate of claim 1, wherein the first microstructures are tapered projections, spaced from each other, and arranged in a matrix; the second microstructures are tapered grooves, spaced from each other, and arranged in a matrix.

3. The composite light guide plate of claim 1, wherein the light guide plate further comprises a bottom surface opposite to the light emitting surface, a plurality of third microstructures formed on the bottom surface.

4. The composite light guide plate of claim 3, wherein the third microstructures are hemispheroidal grooves, spaced from each other, and arranged in a matrix.

5. The composite light guide plate of claim 1, wherein the prism structure further comprises a second surface opposite to the first surface, a plurality of fourth microstructures are formed on the second surface.

6. The composite light guide plate of claim 5, wherein the fourth microstructures are tapered projections, spaced from each other, and arranged in a matrix.

7. The composite light guide plate of claim 5, wherein the number of the fourth microstructures is greater than that of the first microstructure.

8. An apparatus for manufacturing a composite light guide plate, comprising:
    a first molding device configured for molding a light guide plate, comprising:
        a first pattern roller including a first pattern on surface, the first pattern roller configured for forming a plurality of first microstructures on one side of the light guide plate;
        a second pattern roller, the first pattern roller and the second pattern roller being on a same plane and parallel with each other, the first pattern roller and the second pattern roller defining a guide channel therebetween, a width of the guiding channel determining a thickness of the light guide plate; and
        a feeder arranged above and aligned with the guide channel, the feeder configured for molding a pre-cured resin sheet and providing the pre-cured resin sheet to the guide channel; and
    a second molding device configured for forming a prism structure on one side of the light guide plate transferred from the first molding device, comprising:
        a glue tank containing UV curable glue;
        a glue roller partly received in the glue tank to contact with the UV curable glue;
        a first pressing roller arranged above and aligned with the glue roller, the first pressing roller configured for forming a UV curable glue layer whereon transferred from the glue roller when the first pressing roller and the glue roller rotate;
        a second pressing roller arranged above and aligned with the first pressing roller, the second pressing roller configured for cooperating with the first pressing roller to press and bond the UV curable glue layer on the light guide plate to form a glue coating light guide plate; and
        a UV curing machine configured for curing the UV curable glue layer and translating the glue coating light guide plate to composite light guide plate.

9. The apparatus of claim 8, further comprising an adhering device configured for forming covering films on the two opposite surfaces of the composite light guide plate.

10. The apparatus of claim 8, further comprising a cutting device configured for cutting the composite light guide plate in predetermined length and width.

11. The apparatus of claim 10, wherein the cutting device includes a width cutting machine and a length cutting machine, the width cutting machine configured for cutting the width of the composite light guide plate in width, the length cutting machine configured for cutting the length of the composite light guide plate.

12. The apparatus of claim 10, further comprising a collecting device configured for collecting composite light guide plates cut by the cutting device.

13. The apparatus of claim 8, wherein the second pattern roller includes a second pattern on surface, the second pattern roller configured for forming a plurality of third microstructures on another side of the light guide plate.

14. The apparatus of claim 8, wherein the second molding device further comprises a third pattern roller arranged adjacent to and parallel with the first pressing roller, the third pattern roller configured for forming a plurality of fourth microstructures on a surface of the UV curable glue layer away from the light guide plate.

15. The apparatus of claim 14, wherein the UV curing machine is arranged above and is aligned with the third pattern roller.

16. A method for manufacturing a composite light guide plate, comprising:
    providing an apparatus; the apparatus comprising a first molding device configured for molding a light guide plate, and a second molding device configured for forming a prism structure on one side of the light guide plate; the first molding device comprising a first pattern roller, a second pattern roller, and a feeder; the first pattern roller including a first pattern on surface, the first pattern roller configured for forming a plurality of first microstructures on one side of the light guide plate, the first pattern roller and the second pattern roller being on a same plane and parallel with each other, the first pattern roller and the second pattern roller defining a guide channel therebetween, a width of the guiding channel determining a thickness of the light guide plate, the feeder arranged above the first pattern roller and the second pattern roller and aligned with the guide channel, the feeder configured for molding a pre-cured resin sheet and providing the pre-cured resin sheet to the guide channel; the second molding device comprising a glue tank, a glue roller, a first pressing roller, a second pressing roller, and a UV curing machine; the glue tank containing UV curable glue, the glue roller partly received in the glue tank and in contact with the UV curable glue, the first pressing roller arranged above and aligned with the glue roller, the first pressing roller configured for forming a UV curable glue layer whereon transferred from the glue roller when the first pressing roller and the glue roller rotate, the second pressing roller arranged above and aligned with the first pressing roller, the second pressing roller configured for cooperating with the first pressing roller to press and bond the UV curable glue layer on the light guide plate sheet, the UV curing machine configured for curing the UV curable glue layer;

molding a pre-cured resin sheet by the feeder, and then transferring the pre-cured resin sheet to the guide channel between the first pattern roller and the second pattern roller, rotating the first pattern roller and the second pattern roller to form a plurality of first microstructures on one side of the pre-cured resin sheet to form a light guide plate sheet; and rotating the glue roller and the first pressing roller to form a UV curable glue layer on one side of the light guide plate sheet, and then curing the UV curable glue layer to a prism structure by the UV curing machine, the prism structure including a plurality of second microstructures corresponding to and in tight contact with the first microstructures, therefore, a composite light guide plate sheet formed.

17. The method of claim 16, further comprising providing an adhering device, and respectively forming covering films on two opposite surfaces of the composite light guide plate sheet by the adhering device.

18. The method of claim 16, further comprising providing a cutting device, and cutting the composite light guide plate in predetermined length and width by the cutting device.

19. The method of claim 16, wherein the second pattern roller includes a second pattern on surface, the second pattern roller configured for forming third microstructures, the method further comprising forming a plurality of third microstructures on another side of the pre-cured resin sheet simultaneously with forming the first microstructures.

20. The method of claim 16, further comprising providing a third pattern roller arranged adjacent to and parallel with the first pressing roller, and forming a plurality of fourth microstructures on the surface of the UV curable glue layer away from the light guide plate sheet by the third pattern roller before the UV curable glue layer cured.

* * * * *